(12) United States Patent
Gabathuler

(10) Patent No.: US 7,248,712 B2
(45) Date of Patent: Jul. 24, 2007

(54) BASE PLATE WITH ELECTRONIC MODULE

(75) Inventor: Bruno Gabathuler, Stäfa (CH)

(73) Assignee: Phonak AG, Stafa (CH)

( * ) Notice: Subject to any disclaimer, the term of this patent is extended or adjusted under 35 U.S.C. 154(b) by 593 days.

(21) Appl. No.: 10/768,446

(22) Filed: Jan. 30, 2004

(65) Prior Publication Data
US 2005/0111685 A1    May 26, 2005

(30) Foreign Application Priority Data
Nov. 21, 2003  (EP)  .................................. 03026776

(51) Int. Cl.
*H04R 25/00* (2006.01)
(52) U.S. Cl. ...................................... 381/322; 381/324
(58) Field of Classification Search ........ 381/322–330, 381/312, 23.1; 181/128–130, 135
See application file for complete search history.

(56) References Cited
U.S. PATENT DOCUMENTS 4,870,688 A * 9/1989 Voroba et al. ................ 381/60
5,201,008 A * 4/1993 Arndt et al. ................. 381/323
6,735,319 B1 * 5/2004 Vonlanthen ................. 381/330
7,110,562 B1 * 9/2006 Feeley et al. ............... 381/322

\* cited by examiner

*Primary Examiner*—Curtis Kuntz
*Assistant Examiner*—Tuan Duc Nguyen
(74) *Attorney, Agent, or Firm*—Pearne & Gordon LLP

(57) ABSTRACT

The present invention relates to a base plate for the reception of at least one electronic module, whereby the electronic module is insertable and connectable through an opening or slot respectively within the base plate into said base plate. Thereby a part of the electronic module remains accessible from the insertion side or protrudes to the outside. The base plate preferably consists of recesses in the area of the opening according the cross-section shape of the electronic module and in the area of the recesses guiding elements are provided. Those guiding elements are configured such as the electronic module in its vertical end position in relation to the base plate is laterally insertable into the recess with respect to the opening. Such base plates will advantageously be used for hearing aids or hearing devices respectively.

20 Claims, 2 Drawing Sheets

BASE PLATE WITH ELECTRONIC MODULE

BACKGROUND OF THE INVENTION

This invention relates to a base plate for the reception of at least one electronic module, whereby the electronic module is insertable and connectable through an opening or slot respectively within the base plate into said base plate, such as a part of the electronic module remains accessible from the insertion side or protrudes to the outside.

A base plate or face plate respectively will commonly be used for the construction of housings of hearing aids or hearing devices respectively, to which on one hand the shell, i.e. the external housing wall, and on the other hand the electronic elements are arranged.

A base plate with an opening will be used for instance for in-the-ear hearing devices, to which the shell will be attached. The attachment between the base plate and the shell adapted to the wearer of the hearing device is regularly made by adhesion or welding respectively or by manufacturing of the entire housing for in-the-ear hearing devices by laser sintering or stereo lithography. The complete electronic of the device, preferably in form of a module, will be inserted or latched into the opening. The module comprises regularly integrated a battery compartment as well, which comprises a battery cap pivotable arranged over an axis. The battery providing energy to the module may therefore easily be replaced. This replacement may be performed either by specialists or the wearer of the hearing device itself. The advantage of this construction lies in the fact that one unique module may be used for different, usually individually manufactured hearing devices, resulting in positive influence to the costs of the hearing device. Due to the integration of the axis of the battery cap in or at the module, all the forces caused by the manipulation of the cap, for instance by opening or closing of the cap, will indeed be transferred to the module. Those forces may on one side directly damage components of the module and on the other hand damage the current linkage between those components. Especially the contacts, conducting paths and wires of the module are very sensitive with respect to such mechanical force influences.

SUMMARY OF THE INVENTION

It is an object of the present invention to to provide a base plate for electronic modules to enable the modules to be easy accessible from the outside for insertion and exchange.

It is a further object of the present invention to provide a connection between the cap closing the remaining opening and the base plate such as that no forces will be transferred onto the electronic modules.

In one embodiment of the invention there is provided a base plate for the reception of at least one electronic module, whereby the electronic module is insertable and connectable through an opening or slot respectively within the base plate into said base plate, such as a part of the electronic module remains accessible from the insertion side or protrudes to the outside, whereby the base plate consists of recesses in the area of the opening according the cross-section shape of the electronic module and that in the area of the recesses guiding elements are provided, such as that the electronic module in its vertical end position in relation to the base plate is laterally insertable into the recess with respect to the opening. The modules thus may easily be inserted vertically from the outside through the opening and finally laterally be moved to its final position by the arrangement of recesses provided laterally of the opening for the insertion of the electronic module or modules respectively and guiding elements. They are fixed in its final positions due to the guiding elements and are all the same accessible from the outside or protrude to the outside due to the guiding elements.

In another embodiment of the invention, the opening provides of an essentially rectangular or square cross section, which shape will remain essentially the same after the insertion of the electronic modules, thereby merely reducing its width for a small amount. The inserted electronic modules consist preferably of a flat, straight surface towards the opening.

In a further embodiment of the invention, the guiding elements consist of slots and/or guiding faces provided in the base plate, to which accordingly shaped stop faces of the electronic module may be brought into contact. One module thereby may be inserted for instance in one recess or more modules successively consisting of a shape accordingly not to build up an open slot between the several modules.

In a further embodiment of the invention, the opening consists of two oppositely arranged recesses each for an electronic module. Both of the electronic modules therefore may be inserted successively into the opening and laterally be moved into the respective oppositely arranged recesses. An opening will thereby remain between the two modules. A battery may for instance been inserted within this opening.

In a further embodiment of the invention, the electronic modules consist of electronic components such as amplifiers, switches, knobs etc. Each of those components may preferably be provided as detachable modules.

In a further embodiment of the invention, the electronic modules consist of contacts for the connection with a battery or accumulator. A battery compartment may thus easily be built directly by the use of two oppositely arranged electronic modules, into which a battery or accumulator respectively may be inserted to supply the module or modules respectively with power.

In a further embodiment of the invention, a cap is provided, closing the remaining slot of the opening after the insertion and shifting into the final positions of at least two oppositely arranged electronic modules. The cap thereby may further be detachable and/or pivotable connected to the base plate.

In a further embodiment of the invention, at least one bar is arranged transverse to the opening and overarching the opening embedded within the base plate.

In a further embodiment of the invention, at least one bar is arranged serving as pivotable fastening of the cap and as a guiding element for the electronic module. The bar is embedded advantageously within the base plate and the forces applied onto the bar will only be transferred to the base plate but not to the electronic modules. The bar further may serve as a stable guiding element and stop for the electronic modules.

In a further embodiment of the invention, if the cap for closing the opening will be connected with the bar, for instance by means of a pivotable plug-in connection, the cap may serve advantageously as receiver of the battery or accumulator. By rotating the cap into its closed position the battery may be brought into resilient contact with electrical contact tongues arranged at the corresponding electronic modules and thereby providing a power supply for the electronic modules. The forces caused by the pivoting of the cap will be transferred over the bar onto the base plate and absorbed by the base plate, without any influence of the forces onto the electronic modules.

In a further embodiment of the invention, the rim of the cap in its closed state covers at least partially the electronic module such as that said electronic module remains fixed at its final position.

In a further embodiment of the invention, a hearing aid or hearing device respectively with a base plate 1 with a shell connected to the base plate enclosing the electronic module is provided. The invention shape of the base plate is especially suitable for small dimensions occurring in the area of hearing aids or hearing devices respectively. The configuration is especially suitable for in-the-ear hearing aids in the field of miniaturization due to its simple design. A simple exchange of the battery may thus be ensured even by not trained persons, such as the wearer of the hearing device, without any damaging of the electronic modules by movements of the cap designed as battery compartment.

An economic building up of in-the-ear hearing devices may result by using standardized modules, as the shells has to be individually adopted according the different geometrical proportions of the wearers of the hearing devices. Those devices may be used further on in case of a defect due to the use of exchangeable electronic modules, as only the defective module hat to be exchanged.

In a further embodiment of the invention, the use of a base plate for hearing aids or hearing devices respectively is provided.

DESCRIPTION OF THE DRAWINGS

For purpose of facilitating and understanding of the invention, there is illustrated in the accompanying drawings a preferred embodiment thereof to be considered in connection with the following description. Thus the invention may be readily understood and appreciated.

It will be shown in

DESCRIPTION OF A PREFFERED EMBODIMENT

Figure 1:
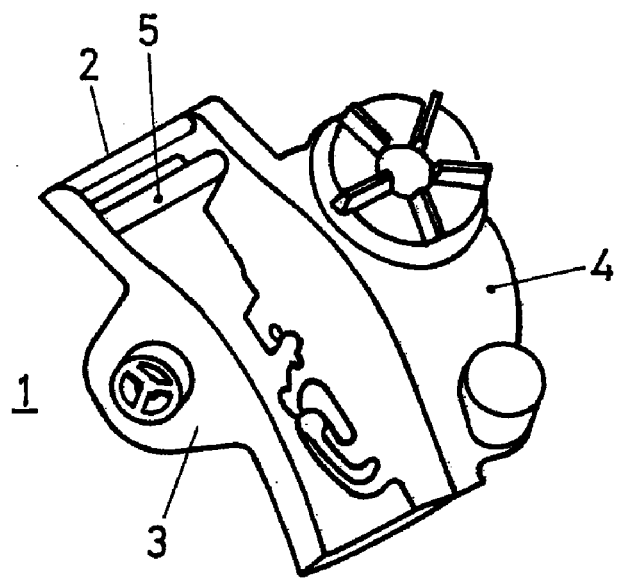
FIG. 1 the view of an inventively shaped base plate with two inserted electronic modules.

FIG. 1 is showing the base plate 1 of a hearing device viewed from the outside. Two electronic modules 3 and 4 are inserted into the opening 2 and shown moved laterally into its final positions. An essentially rectangular opening remains further on between the two electronic modules 3 and 4.

The opening is further on overarched by a bar 5, which bar is laterally held or embedded respectively in the base plate 1. This bar 5 may for instance serve as pivotable attachment of a caop (not shown in FIG. 1) for closing the remaining opening. This cap may advantageously serve as holder for a button-shaped battery, which battery serves as power supply for the electronic modules.

Figure 2:
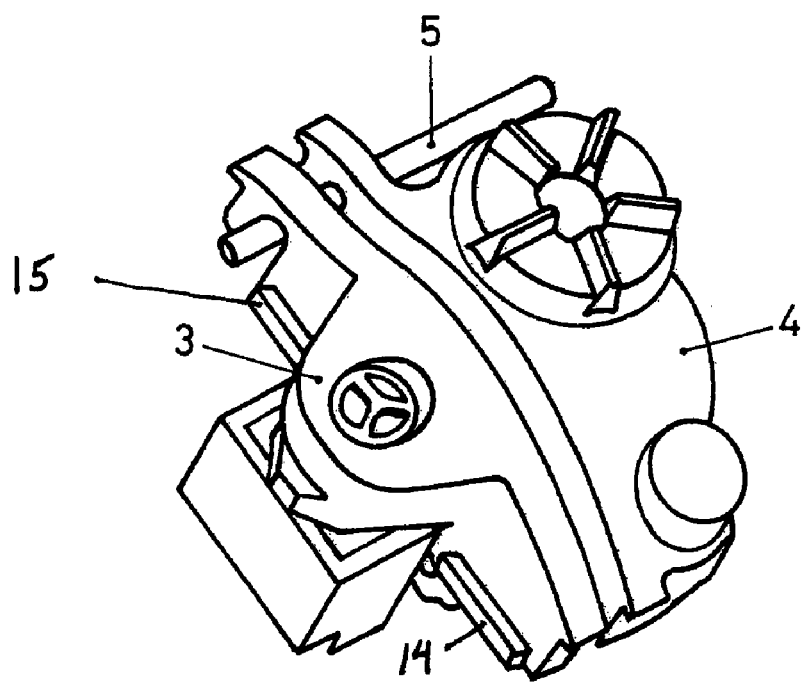
FIG. 2 the view of both modules according FIG. 1 without the base plate in its closed shifted position.

FIG. 2 now is showing the two electronic modules 3 and 4 without the base plate 1 for better overview purposes. Both electronic modules 3 and 4 are arranged practically adjoining each other. The modules 3 and 4 may be inserted in this position though the opening 2 of the base plate 1. Normally the one module 3 will be inserted first and the second module 4 further on, as the opening 2 only has a restricted width. The module 3 is already set in its laterally final position in the pictured position, apparent from its position relative to the as well pictured bar 5.

Figure 3:
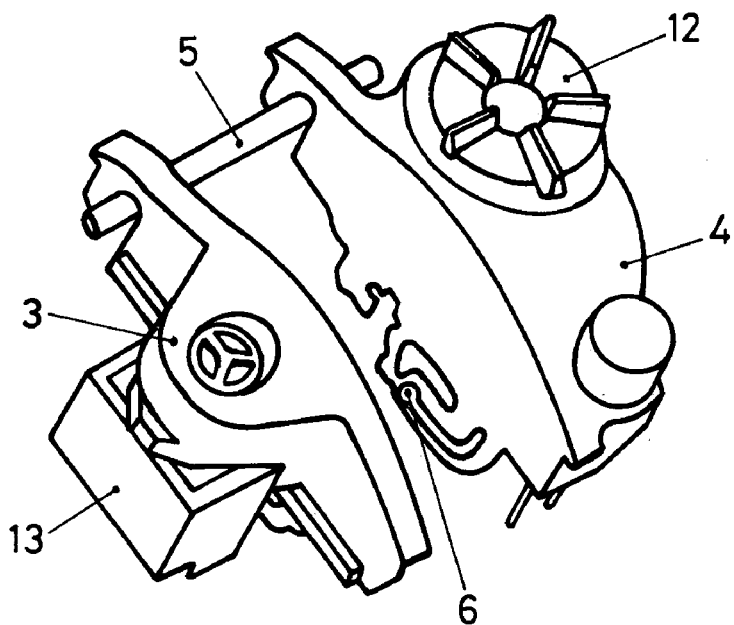
FIG. 3 the view according FIG. 2 in the final position.

The second module 4 may now be moved laterally into its final position, as pictured in FIG. 3. Thereby the opening already shown in FIG. 1 will be formed between the two modules 3 and 4. This opening now just has the width to insert a battery between the two modules 3 and 4, which may be brought into conducting contact with contact tongues 6 or 7 respectively arranged advantageously on the two modules 3 and 4. The already mentioned cap may therefore be configured in a well known manner as a battery cap fixing the battery and pivoting into its final position.

Figure 4:
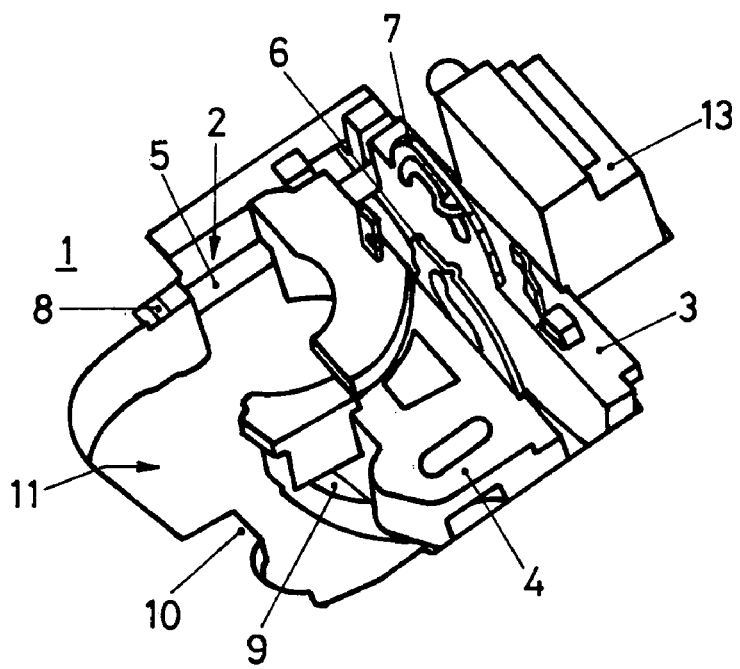
FIG. 4 the view according FIG. 1 from the inside of the base plate.

FIG. 4 is showing the view of the position of both modules 3 and 4 according to FIG. 2 from below the base plate 1. The guiding slots 8 provided at the underside of the base plate 1 are visible, to which the stop faces of the module 4 will come into contact by its lateral movement. Similar stop faces 14, 15 of the module 3 are shown in FIG. 2, which come into contact with similar guiding slots (not shown). A further stop face 9 of the module 4 is visible as well, which comes into contact against a pin 10 in the area of the recess 11 of base plate 1 from the upper side.

The bar 5 serves as well as a guiding element or stop face respectively for the module 3. The guiding slot 8 and stop faces 9 respectively may consist of cam shaped elevations, which serves as snapping elements for the detachable fixation of the electronic modules 3 or 4 respectively in its final positions.

The electronic modules 3 or 4 respectively themselves consist of electronic components preferably in modular shape, such as for instance a turn-switch module 12 or a microphone module 13.

I claim:

1. A base plate for reception of at least one electronic module, comprising:
    an opening or slot within the base plate, wherein the electronic module is vertically insertable or connectable through the opening or slot respectively such that a part of the electronic module remains accessible from the insertion side or protrudes to the reverse side;
    a recess in an area of the opening or slot of the base plate having a shape corresponding to a cross-sectional shape of the electronic module; and
    guiding elements in an area of the recess such that the electronic module is laterally insertable into the recess after vertical insertion or connection through the opening or slot.

2. Base plate according to claim 1, whereby the opening or slot provides an essentially rectangular or square cross section.

3. Base plate according to claim 1, whereby the guiding elements comprise slots and/or guiding faces provided in the base plate, to which accordingly shaped stop faces of the electronic module may be brought into contact.

4. Base plate according to claim 1, whereby the opening or slot comprises two oppositely arranged recesses each for an electronic module.

5. Base plate according to claim 1, whereby the electronic module comprises electronic components such as amplifiers, switches, knobs etc.

6. Base plate according to claim 5, whereby the electronic components are each provided as detachable modules.

7. Base plate according to claim 1, whereby the electronic module comprises contacts for connection with a battery or accumulator.

8. Base plate according to claim 1, whereby a cap is provided, closing a remaining portion of the opening after insertion and shifting into final position of the electronic module.

9. Base plate according to claim 8, whereby the cap is detachable and/or pivotably connected to the base plate.

10. Base plate according to claim 8, whereby at least one bar is arranged transverse to the opening and overarching the opening and embedded within the base plate.

11. Base plate according to claim 8, whereby at least one bar is arranged serving as a pivotable fastener of the cap and as a guiding element for the electronic module.

12. Base plate according to claim 8, whereby a rim of the cap in its closed state covers at least partially the electronic module such as that said electronic module remains fixed at its final position.

13. Hearing aid or hearing device respectively with a base plate according to claim 1 with a shell connected to the base plate enclosing the electronic module.

14. Use of a base plate according to claim 1 for hearing aids or hearing devices respectively.

15. Base plate according to claim 1 further comprising a cap vertically insertable into the opening or slot and closing a portion of the opening or slot that remains open after the electronic module has been laterally inserted into the recess.

16. Base plate according to claim 15 wherein the cap holds the electronic module in position in the recess.

17. Base plate according to claim 15 wherein a second electronic module is vertically insertable or connectable through the opening or slot and laterally insertable into a second recess in an area of the opening or slot of the base plate having a shape corresponding to a cross-sectional shape of the second electronic module and the cap is insertable in between the one electronic module and the second electronic module.

18. Base plate according to claim 1 wherein a second electronic module is vertically insertable or connectable through the opening or slot and laterally insertable into a second recess in an area of the opening or slot of the base plate having a shape corresponding to a cross-sectional shape of the second electronic module and a battery or accumulator is insertable between the one electronic module and the second electronic module.

19. Base plate according to claim 18 further comprising a cap adapted to hold said battery or accumulator, said cap being vertically insertable into the opening or slot and closing a portion of the opening or slot that remains open after the electronic modules have been laterally inserted into the recesses.

20. Base plate according to claim 1, wherein the stop faces of the electronic module engage in the slots and/or guiding faces of the guiding elements.

* * * * *